United States Patent [19]

Harkness

[11] 4,090,345
[45] May 23, 1978

[54] BRAKE SAFETY SYSTEM FOR A POWER DRIVEN ROTARY MOWER

[75] Inventor: Joseph R. Harkness, Germantown, Wis.

[73] Assignee: Briggs & Stratton Corporation, Wauwatosa, Wis.

[21] Appl. No.: 741,732

[22] Filed: Nov. 15, 1976

Related U.S. Application Data

[62] Division of Ser. No. 667,696, Mar. 17, 1976, Pat. No. 4,037,389.

[51] Int. Cl.² .............................................. A01D 69/10
[52] U.S. Cl. .................................................... 56/10.5
[58] Field of Search .................... 56/11.3, 11.6, 11.7, 56/10.5, 16.7, DIG. 18; 188/82.7, 71.7, 68, 177; 74/523

[56] References Cited

U.S. PATENT DOCUMENTS 3,228,177   1/1966   Coates ................................. 56/10.5

*Primary Examiner*—Jay N. Eskovitz
*Attorney, Agent, or Firm*—Ira Milton Jones and Associates

[57] ABSTRACT

An engine powered rotary lawn mower has a brake which upon being engaged stops the engine crankshaft and the cutter blade fixed thereto. A deadman control on the handle of the mower, upon being moved partway to the "run" position in which it must be held to enable operation of the mower, disengages the brake. A manually activated gravity deactivated latch holds the deadman control in brake-off position to enable starting the engine, until the deadman control is moved all the way to the "run" position whereupon gravity deactivates the brake.

6 Claims, 8 Drawing Figures

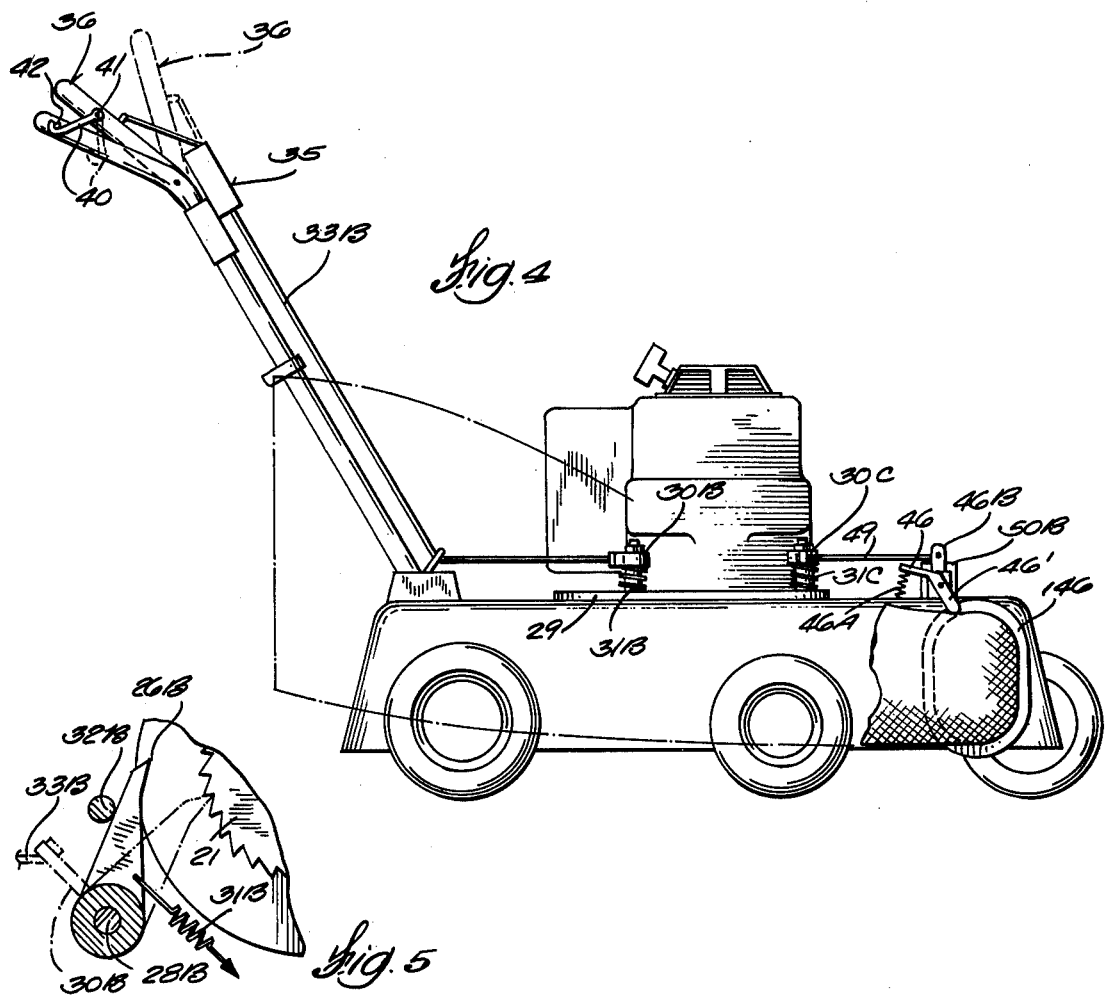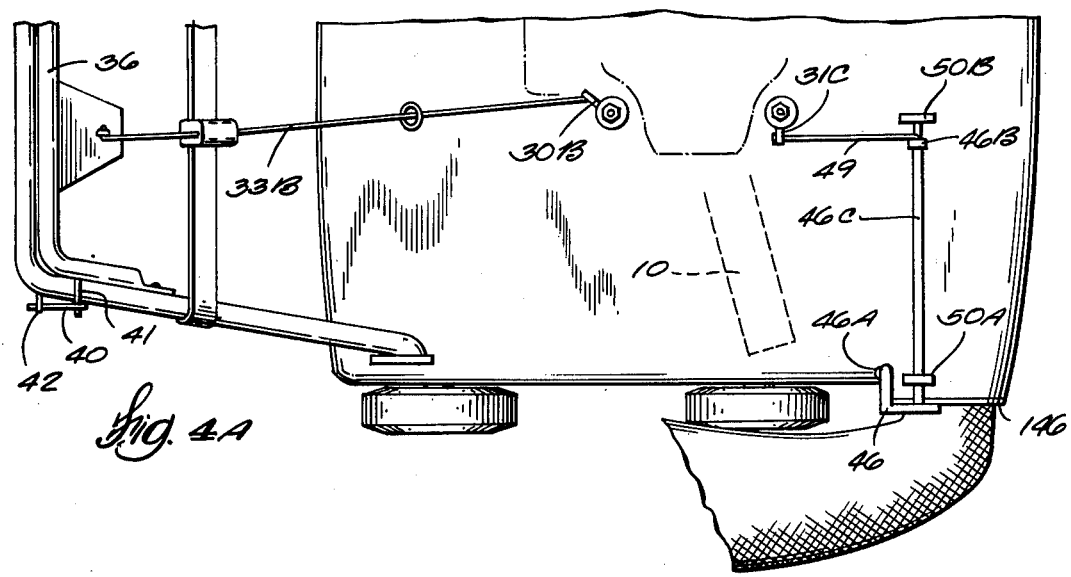

BRAKE SAFETY SYSTEM FOR A POWER DRIVEN ROTARY MOWER

This invention, like that of the now-abandoned application Ser. No. 485,946, which was supplanted by application Ser. No. 667,696, now Pat. No. 4,037,389, of which the instant application is a division, has as its purpose to provide a brake capable of quickly stopping an internal combustion engine or other prime mover, used to power lawn mowers — and, more particularly, mowers of the walk-behind rotary type.

While the invention herein described reduces or eliminates certain hazardous conditions in rotary lawn mowers, attention is directed to the fact that it may in itself present safety hazards if it is not properly designed and engineered in its specific embodiments. It is imperative, therefore, that the highest degree of skill and care be exercised in the practical application of the invention, and that every prototype embodying the invention be fully and conscientiously tested before commercial models are released to the public.

One of the objectionable characteristics and hazards of rotary mowers results from the fact that their blades continue to rotate for a time after the application of driving torque thereto is terminated. Thus, for example, where the prime mover is a single cylinder internal combustion engine and the blade is fixed directly to the crankshaft of the engine, friction and compression pumping losses can be and have been relied upon to stop the blade after the engine ignition is shut off. But there may be a time lag of four or five seconds between shutting off the ignition and final stopping of the engine, and of the blade fixed to its crankshaft. While that is not a very long time, a reliable brake mechanism by which that time lag could be materially reduced, would be an improvement, especially if its cost were reasonable.

With a view of achieving that objective, this invention has as its principle object the provision of a simple reliable brake mechanism that can be made a part of the engine and by which rotation of an engine crankshaft and a rotary mower blade secured thereto is, for all intents and purposes, stopped instantaneously and automatically upon activation of the brake mechanism.

Another object of this invention is to provide a brake mechanism that can be activated in a number of different ways, either automatically as a consequence of the performance of a function of the machine for which the brake-equipped engine provides power — as, for instance, the removal of the grass catching bag on a rotary lawn mower, or intentionally by a key controlled device with a view to preventing unauthorized use of the machine.

More specifically, it is the purpose and object of this invention to equip the engine of a power driven rotary lawn mower with a reliable brake mechanism by which rotation of its drive shaft can be stopped practically instantaneously, which brake mechanism is of the disc type and comprises a pair of frictionally engaged discs, one of which is secured to the drive shaft of the engine and the other of which is free to rotate about the drive shaft, a ratchet wheel affixed to or with respect to the free disc, and associated pawl means mounted on a part fixed with respect to the engine, and operable to engage the ratchet wheel to abruptly stop rotation of the free disc and, through its frictional engagement with the other disc, effect frictional braking of the rotating drive shaft and the cutting blade fixed thereto.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of the physical embodiments of the invention constructed according to the best modes so far devised for the practical application of the principles thereof, and in which:

FIG. 4 is an enlarged fragmentary view in side elevation illustrating the manner in which a deadman or safety control can be employed to activate the brake mechanism and effect quick stopping of the engine and the blade fixed thereto;

FIG. 4A is a fragmentary plan view of the deadman control shown in FIG. 4; and

FIG. 5 is an enlarged fragmentary view in section illustrating a detail of the brake mechanism.

Figure 1:
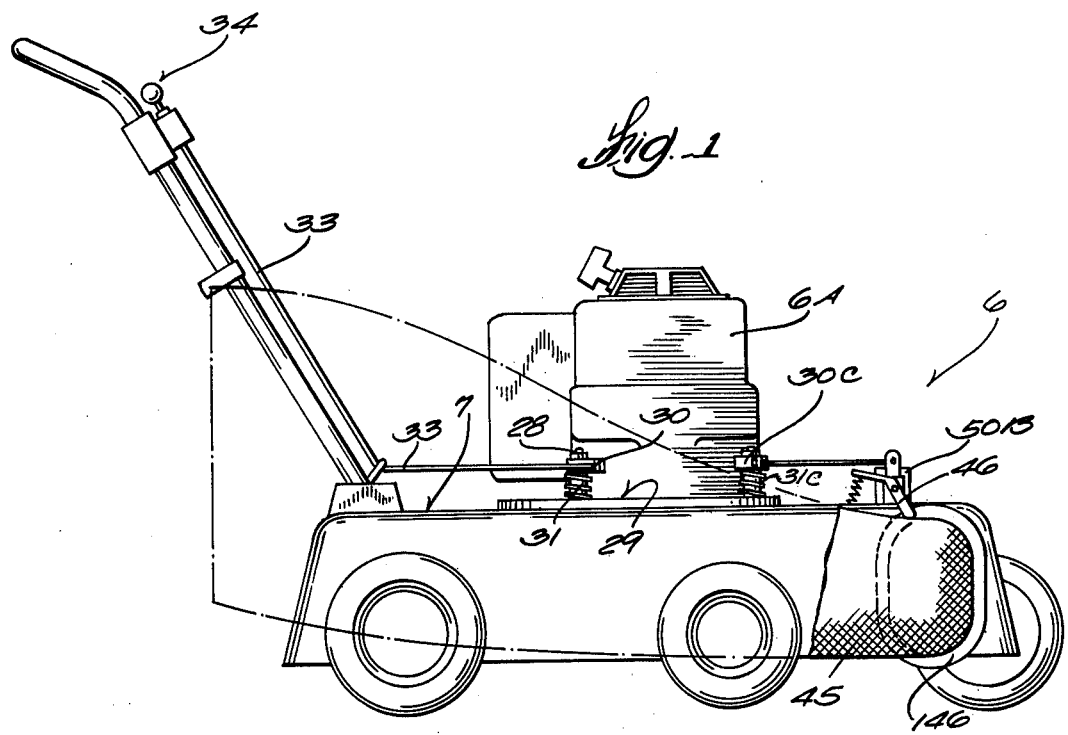
FIG. 1 is a side elevational view of a walk-behind rotary mower powered by an engine equipped with the brake mechanism of this invention.
Figure 1A:
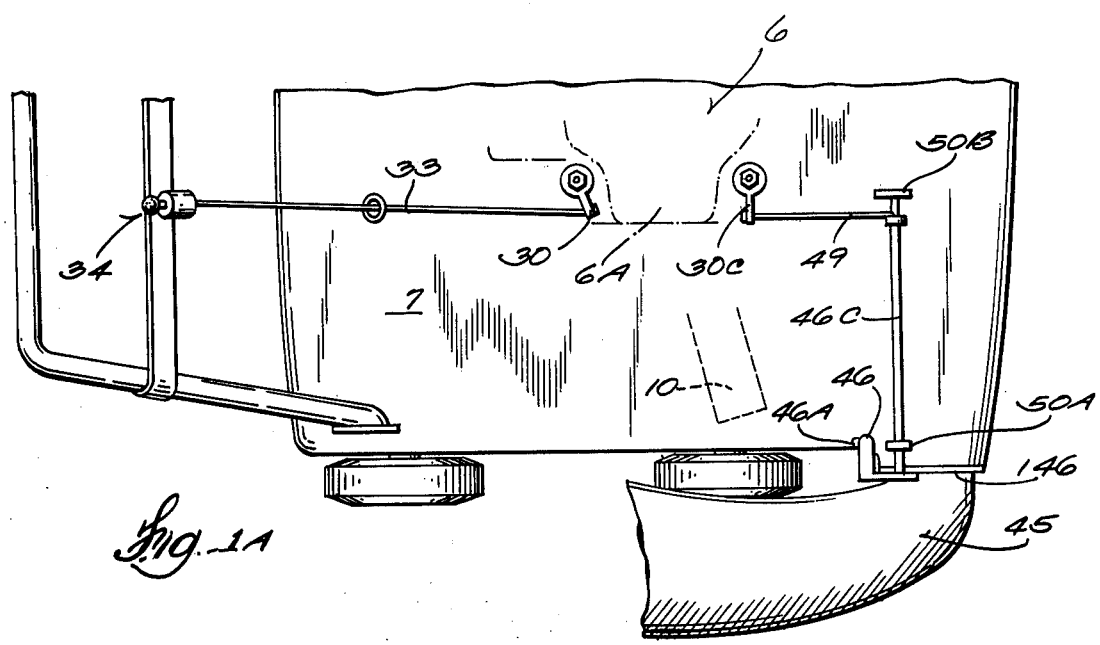
FIG. 1A is an enlarged fragmentary plan view of the rotary mower shown in FIG. 1.

Referring now more particularly to the accompanying drawings, the numeral 6 in FIGS. 1 and 1A generally designates a walk-behind rotary lawn mower powered by a single cylinder internal combustion engine 6A. The engine is mounted on the deck 7 of the mower housing, and preferably is of the vertical shaft type having its crankshaft — which constitutes the drive shaft of the engine — disposed vertically, with its lower end portion 9 projecting downwardly through the deck of the lawn mower, to have the blade 10 of the mower fixed thereto. Although not illustrated, it will be understood that the mower can be equipped with traction wheels drivingly connectible with the engine.

The frictional brake mechanism 11 of this invention (see FIG. 2) is operatively interposed between the underside of the mower deck and the power blade 10. It consists of a pair of discs 17 and 18 concentrically encircling the lower portion 9 of the engine crankshaft, the former — which is lowermost — being fixed to the crankshaft and the latter being freely rotatable with respect thereto. An annular washer-like brake shoe 19 is interposed between the peripheral portions of the discs and is secured to one of them to provide a frictional torque transmitting connection between the discs in consequence of their being forced towards one another by a spring 22. This spring encircles the crankshaft and reacts between the upper disc 18 and a flange 23 fixed to the crankshaft upwardly of the disc 18. By virtue of this torque transmitting connection, the discs 17 and 18, the engine crankshaft and the mower blade 10 fixed thereto all rotate in unison until rotation of the free upper disc is stopped. When that occurs, the frictional torque transmitting relationship between the discs abruptly stops the engine and, with it, rotation of the blade.

The lower disc 17 is a relatively large diameter flange integral with the upper end of a hub 12 that is keyed to the drive shaft 9. A smaller flange 14 extending across the bottom of the hub has diametrically opposite downwardly directed driving lugs 15 that project into holes in the blade to provide a positive driving connection between the drive shaft and the blade when the latter is clamped to the flange 14 by a bolt 16 threaded into the bottom of the drive shaft.

The upper disc 18 which is freely rotatable with respect to the drive shaft, has a ratchet wheel 21 superimposed upon it and secured against rotation with respect thereto in any suitable manner, as by one or more pins 21A. Since the ratchet wheel overlies the free upper disc 18, the force of the compression spring 22 is applied to the disc through the ratchet wheel.

Figure 2:
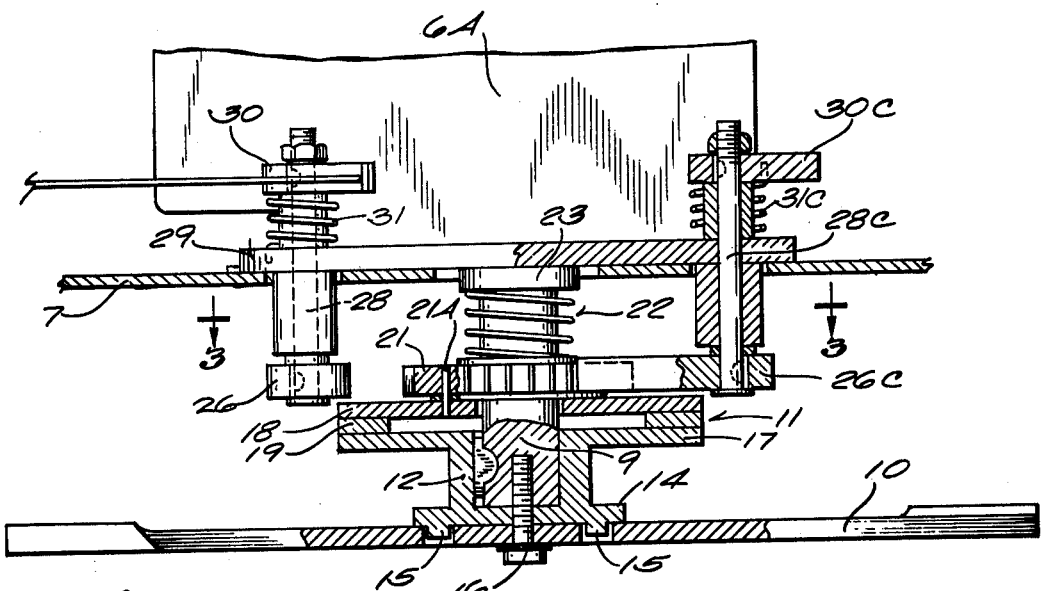
FIG. 2 is an enlarged fragmentary-sectional view illustrating the brake mechanism in greater detail.
Figure 2A:
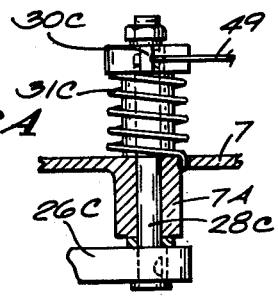
FIG. 2A is an enlarged fragmentary sectional view of a modified embodiment of a part of the brake mechanism.
Figure 3:
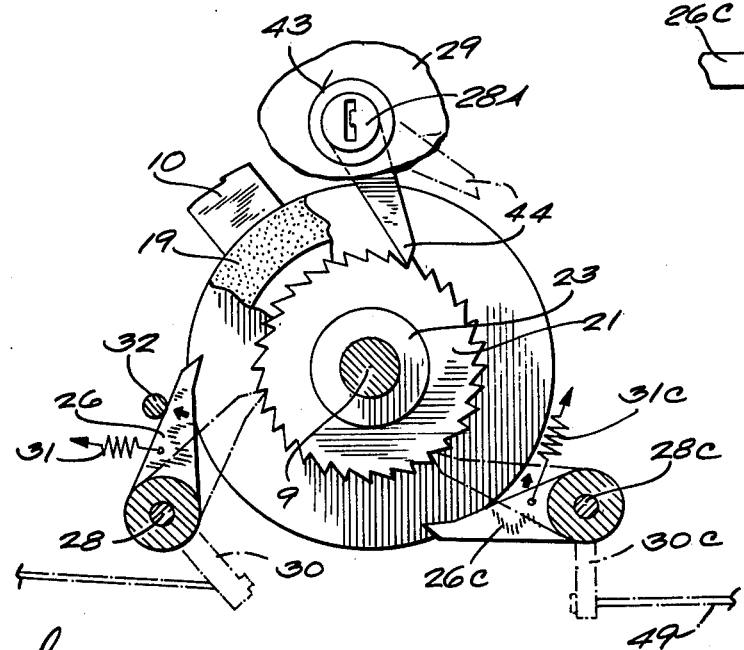
FIG. 3 is a cross sectional view taken on the line 3—3 of FIG. 2.

Inasmuch as the free upper flange 18 and the ratchet wheel are constrained to rotate in unison, it follows that rotation of both can be abruptly stopped by the engagement with the teeth of the ratchet wheel of either of two pawls 26 or 26C in that embodiment of the invention illustrated in FIGS. 1, 1A and 2; and — in that of FIG. 3 — by a pawl 26A. These pawls are respectively keyed to the lower end portion of vertical shafts 28, 28C and 28A, all of which are journalled in bearings fixed with respect to the engine. In FIG. 2, the bearings in which these pawl-carrying shafts are journaled are secured to a mounting plate 29 that may be integral with the engine crankcase, or — as shown in FIG. 2A — these bearings may be provided by bored bosses 7A integral with and projecting down from the mower deck.

The pawl 26 is yieldingly held in a retracted position defined by its engagement with a fixed stop 32 depending from the underside of the deck 7 by a torsion spring 31 reacting between a fixed point on the plate 29 and a lever arm 30 fixed to and projecting from the upper end of the shaft. It remains in its retracted position until the operator exerts a pull on an actuator knob 34 that is operatively connected by a cable 33 with the lever arm, and is slidably mounted on the handle for the mower. Upon the application of a pull on the knob 34, the outer end of the pawl is moved into latching engagement with the ratchet wheel 21. This, of course, stops the ratchet wheel and the upper brake disc to which it is secured, and within less than one second, the frictional torque transmitting connection between the brake discs stops the lower disc 17 and the engine crankshaft.

Although not shown in the drawings, it will be readily apparent that in the event the drive shaft 9 is that of an electric motor, switching mechanism can be actuated by a brake engaging pull on actuator knob 34 to effect de-energization of the motor concurrently with engagement of the brake.

As an alternative to the just-described manner of engaging the pawl with the ratchet wheel, a deadman control 35 may be employed, as shown in FIG. 4. This deadman control comprises a control member 36 which, during operation of the mower, must be continuously held in the rearwardly swung position shown in solid lines in FIG. 4. Unless this is done, operation of the mower is not possible. The control member 36 is connected by a cable 33B with an associated arm 30B that projects radially from the shaft 28B of the pawl 26B to maintain the latter in its ratracted inactive position against the force of an actuating spring 31B, see FIGS. 4 and 5. Upon either accidental or deliberate release of the control member 36, the spring 31B pivots the pawl 26B forwardly into engagement with the teeth of ratchet wheel 21 and thus, as described before, brings about abrupt stopping of upper brake disc 18 and frictional braking of lower disc 17.

To preset the deadman control 35 of FIG. 4 for operation of the mower, the control member 36 is pulled rearwardly into close proximity to the main fixedly mounted handle MH of the mower, as shown in solid lines in FIGS. 4 and 4A. Movement of control member 36 to this position acts through the cable 33B and arm 30B in opposition to the spring 31B to swing the pawl 26B to its retracted position defined by stop 32B.

To retain the control member 36 in its solid line pawl-disengaging position and thus enable the engine to be started, a gravity release latch finger 40 is pivotally secured by a pin 41 to the control member 36. With the control member 36 in its rearwardly pivoted position, the latch finger 40 is manually engaged with a retainer pin 42 extending later—all from the main handle MH as shown in FIGS. 4 and 4A. This holds the control member 36 in its retracted position, permitting the engine to be started.

After the engine is started, the operator draws the control member 36 closer towards the main handle, with the result that the latch finger 40 drops away from the retainer pin 42 to its disengaged position shown in dotted lines in FIG. 4. This establishes the desired operating condition requiring that the operator continue to manually retain the control member 36 in close proximity to the main handle in opposition to spring 31B. Hence, upon either accidental or deliberate manual release of the control member 36 from that position, the spring 31B rocks the pawl 26B forwardly to activate the brake mechanism.

In some engine powered mowers, the engine is equipped with an electric starter activated by a key controlled ignition switch. To reduce the hazards incident to operating a mower so equipped, separate manually presettable latch means 43 are provided to prevent accidental starting of the engine. As shown in FIG. 3, this latch means comprises a pawl 44 that is movable from a retracted inactive position (shown in dotted lines) to a position (shown in solid lines) engaging the teeth of the ratchet wheel 21 and thereby preventing rotation of the engine crankshaft. Thus, whenever the pawl 44 is engaged with the ratchet wheel, as shown, the engine cannot be started.

The pawl 44 is secured to the lower end of its vertical shaft 28A, the upper end of which is provided with a key controlled lock which must be unlocked before the shaft can be turned to disengage the pawl from the ratchet wheel. Thus by simply requiring that the lock which secures the shaft 28A against rotation be controlled by a key different from that of the ignition switch, unauthorized or accidental starting of the engine can be prevented.

In addition to the thus far described ways of activating the brake mechanism, removal of the grass bag 45 from the mower also can be used for the purpose. To that end the third pawl 26C is provided. This pawl is keyed to the lower end of a vertical shaft 28C that in all respects is like the shaft 28. Hence it has a radially extending arm 30C fixed to its upper end. In this case, however, the arm 30C and pawl 26C are held in the retracted inactive position in opposition to spring 31C (FIG. 3) by the presence of the grass catching bag 45 in its operative position on the mower.

Referring to FIGS. 4 and 4a, before the bag 45 can be removed, it is necessary to deactivate a latch device 46 which, in its active condition, prevents removal of the bag. This latch device comprises a blocking finger 46' fixed to and projecting radially from one end of a shaft 46C that is journalled in coaxial holes in bosses 50A and 50B rising from the mower deck. The shaft 46C is suitably restrained against endwise displacement from a position in which the blocking finger swings in a plane so located with respect to the grass discharge port of the mower that, upon attachment of the grass bag to the mower, the blocking finger, in its operative position, engages over a flange 14G encircling the mouth of the bag, making it impossible to remove the bag until the blocking finger is lifted out of its operative position.

A spring 46A that reacts between the mower deck and a part fixed with respect to the blocking finger yieldingly holds the blocking finger in its operative position.

At a point remote from the blocking finger, the shaft 46C has a lever 46B fixed thereto and projecting radially therefrom. A motion transmitting link 49 connects the free end of this lever with an arm 30C that projects radially from shaft 28C (FIG. 3) to which the pawl 26C is fixed. Accordingly, engagment of the pawl 26C with the ratchet wheel under the influence of its spring 31C depends upon the position of the blocking finger 46'. As the latter is allowed to be moved by its spring 46A to its operative position preventing detachment of the grass bag, the consequent rotation of the shaft 46C, acting through the link 49, rotates the shaft 28C in the direction to hold the pawl 26C out of engagement with the ratchet wheel. It is, of course, to be understood that despite appearances to the contrary resulting from the diagrammatic showing of the spring 46A in FIG. 4, this spring is stronger than the spring 31C.

Upon lifting the blocking finger out of its operative position to free the grass bag for detachment from the mower, the consequent rotation of the shaft 46C enables the spring 31C to move the pawl 26C into engagement with the ratchet wheel. It follows, therefore, that removal of the grass bag is accompanied by stopping of the engine, and attachment of the grass bag along with re-engagement of the latch 45, allows the engine to be restarted.

Although perhaps unnecessary, it is noted that the diagrammatic showing of spring 46A in FIGS. 1 and 4, the springs 31 and 31C in FIG. 3 and the spring 31B in FIG. 5, is illustrative of the actual springs, all of which may be torsion springs, as shown in FIGS. 1, 2, 2A and 4.

Those skilled in the art will appreciate that the invention can be embodied in forms other than as herein disclosed for purposes of illustration.

The invention is defined by the following claims:

1. In combination with a rotary mower having a housing with a support deck, and a handle member for manually guiding directional movement of said mower:
   A. a power driven rotary shaft projecting downwardly through said deck and having an end portion below the deck;
   B. a blade and first disc affixed to said end portion of the shaft;
   C. a rotary brake disc journalled on said end portion of the shaft and having spaced apart tooth means radially spaced from the axis of said rotary brake disc;
   D. means providing a spring loaded frictional driving connection between said discs;
   E. a pawl constrained to pivotal movement about an axis fixed with respect to said rotary shaft and yieldingly biased toward engagement with said tooth means;
   F. a manually operable control member movably associated with the handle member of the mower and operatively connected with said pawl so as to be yieldingly urged in one direction by the biasing force acting on the pawl, to a first position relative to the handle member in which position the pawl is engaged with said tooth means and from which position it is movable in the opposite direction to a second position holding the pawl disengaged from said tooth means and permitting power driven rotation of the mower blade; and
   G. manually activated gravity deactivated latch means arranged to react between said members and upon being activated hold said control member in said second position, as long as said manually operable control member is not moved farther in said opposite direction, whereby upon gravity effected deactivation of the latch means said control member must be manually held against movement to its first position to permit continued power driven rotation of said blade.

2. The combination of claim 1, wherein said latch means comprises a latch finger movably mounted on one of said members for movement from a gravity-maintained inoperative position to an operative position engaged with a retainer on the other of said members.

3. The combination of claim 1, further characterized by:
   an additional pawl mounted on the housing for manually controlled movement to and from an operative position engaged with said tooth means; and lock means operable to secure said additional pawl in its operative position to thereby prevent unauthorized operation of the mower.

4. The combination of claim 1, further characterized by:
   A. a stop pawl journalled in a bearing depending from said support deck;
   B. resilient means connected with said stop pawl to yieldingly urge the pawl to a retracted position relative to said tooth means; and
   C. manually operable motion transmitting means connected with said stop pawl for effecting movement thereof into latching engagement with said tooth means in opposition to said resilient means.

5. The combination of claim 1, further characterized by:
   A. a discharge opening at one side of said mower housing adapted to detachably receive thereover the mouth of a grass catcher bag;
   B. a latch device mounted on said mower housing for movement to and from an operative position preventing removal and/or placement of a grass catcher bag over said discharge opening;
   C. a function change pawl mounted on said mower housing for movement to and from an operative position engaged with said tooth means; and
   D. resilient means operatively connected with said latch device and with said function change pawl to yieldingly urge the latter into engagement with said tooth means whenever said latch device is moved out of its operative position enabling a grass catcher bag to be removed from or placed in position over said discharge opening.

6. The combination with a walk-behind power lawn mower having a wheeled chassis with a deck, an engine mounted on the deck of the chassis, a handle extending from the chassis by which the mower is guided, a cutter blade below the deck of the chassis and means drivingly connecting the cutter blade with the engine whereby the cutter blade is driven as long as the engine is in operation, of a dead-man control which must be maintained in a predetermined condition for the engine to run, and which comprises:
- A. a control lever pivotally mounted on the handle for movement between a run position and a stop position;
- B. means operatively connected with said control lever and operable to effect stopping of the engine upon movement of the control lever to its stop position;
- C. means yieldingly urging the control lever to its stop position with a force readily overcome by an operator so that as long as the operator holds the control lever out of its stop position the engine can run;
- D. latch means arranged to react between the handle and the control lever for releasably holding the control lever against movement towards its stop position beyond a predetermined location, said latch means including manually engageable and automatically disengageable detent means to hold the latch means engaged as long as said control lever is not moved towards its run position from the location in which it is held by the latch means, to thus enable starting the engine without manually holding the control lever against movement to its stop position, and said detent means being automatically disengaged by movement of the control lever towards its run position from said predetermined location and being incapable of engagement when the control lever is in its run position, so that continued operation of the engine requires that the control lever be manually held in its run position.

* * * * *